C. C. GAMM & C. F. NELSON.
VEHICLE SPRING.
APPLICATION FILED OCT. 4, 1913.
1,116,878.
Patented Nov. 10, 1914.
2 SHEETS—SHEET 1.
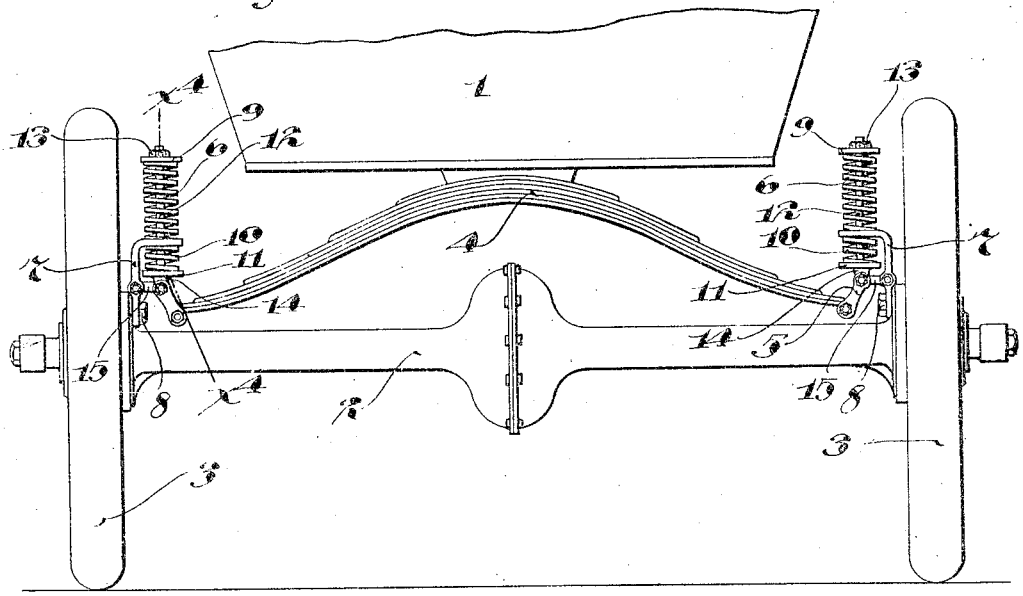
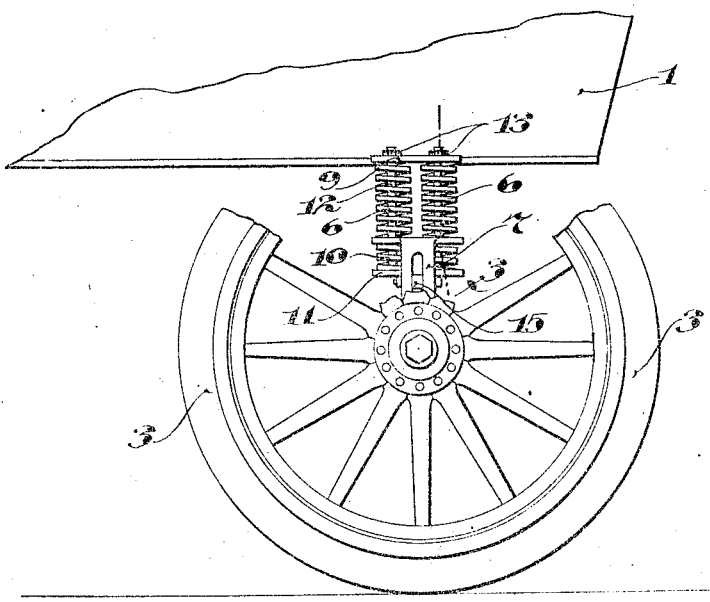
Witnesses
E. C. Skinkle
A. H. Opsahl
Inventors
Charles C. Gamm
Carl F. Nelson
By their Attorneys
Williamson Merchant

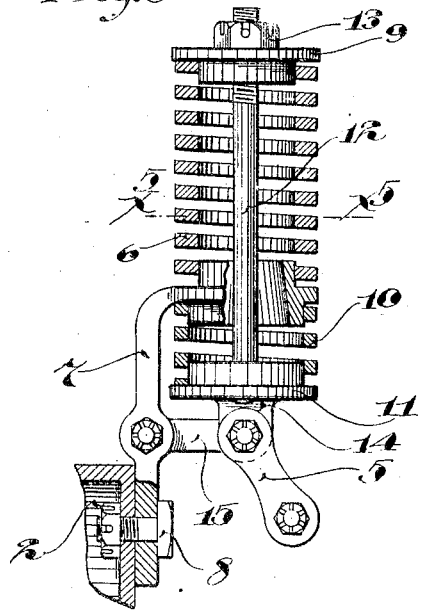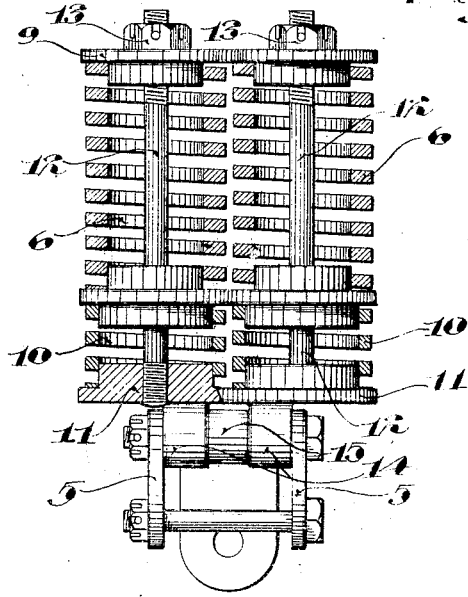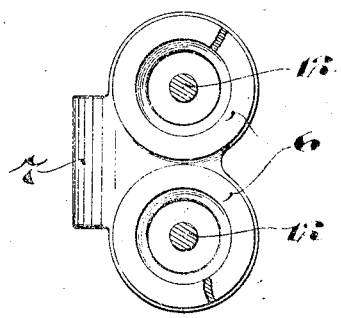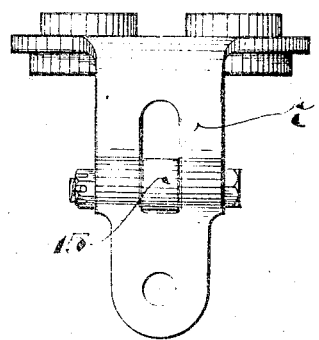

UNITED STATES PATENT OFFICE.

CHARLES C. GAMM AND CARL F. NELSON, OF MINNEAPOLIS, MINNESOTA.

VEHICLE-SPRING.

1,116,878.

Specification of Letters Patent.  Patented Nov. 10, 1914.

Application filed October 4, 1913. Serial No. 793,375.

*To all whom it may concern:*

Be it known that we, CHARLES C. GAMM and CARL F. NELSON, citizens of the United States, residing at Minneapolis, in the county of Hennepin and State of Minnesota, have invented certain new and useful Improvements in Vehicle-Springs; and we do hereby declare the following to be a full, clear, and exact description of the invention, such as will enable others skilled in the art to which it appertains to make and use the same.

Our invention has for its object to provide an improved vehicle spring, especially adapted for use in connection with automobiles, and to such ends, generally stated, the invention consists of the novel devices and combinations of devices hereinafter described and defined in the claim.

In the accompanying drawings, which illustrate the invention, like characters indicate like parts throughout the several views.

Referring to the drawings, Figure 1 is a rear elevation, showing parts of the running gear and body of an automobile, and illustrating our improved spring mechanism arranged to support the latter over the former, some parts being broken away; Fig. 2 is a side elevation of the parts shown in Fig. 1, some parts being broken away; Fig. 3 is a detail in vertical section taken on the line $x^3$ $x^3$ of Fig. 2; Fig. 4 is a vertical section taken approximately on the line $x^4$ $x^4$ of Fig. 1, some parts being shown in full; Fig. 5 is a horizontal section taken on the line $x^5$ $x^5$ of Fig. 3; and Fig. 6 is a view in elevation showing one of the spring supporting brackets.

The numerals 1, 2 and 3 indicate, respectively, the automobile body, the rear axle casing, and the rear wheels.

The numeral 4 indicates a semi-elliptical spring, the intermediate outwardly bowed portion of which is directly connected to the body 1. This spring 4, in the ordinary or old construction, would be connected at its ends by links 5 directly to so-called spring brackets, or other suitable parts on the vehicle running gear. In our improved spring mechanism, the spring 4 is used as a primary spring and its ends are connected to suitable parts of the vehicle running gear, through so-called secondary springs. These secondary springs are preferably coiled springs 6 arranged in pairs on the opposite sides of the vehicle, seated on the laterally in-bent ends of so-called spring brackets 7, which, in turn, are bolted or otherwise rigidly secured at 8 to under portions of the rear axle casing 2.

Spring caps 9 are seated on the upper ends of the so-called secondary spring 6. Recoil springs 10 are seated on lower spring caps 11 with their upper ends bearing against the under surfaces of the in-turned ends of the spring brackets 7. The spring caps 9 and 11 and the in-turned ends of the brackets 7 are formed with hubs that telescope into the ends of the coiled springs and keep the same properly alined. Also, the in-turned ends are perforated to afford ample clearance for hanger-bolts 12 that are extended therethrough, and are connected to the spring caps 9 and 11. As shown, the lower ends of the bolts 12 are screwed into the lower caps 11 and the threaded upper ends are loosely passed through the upper caps, and are provided with nuts 13, by adjustments of which the normal tension of the springs 6 and 10 may be varied. In this twin or duplex arrangement of the secondary springs 6 and recoil springs 10, the in-turned portions of the brackets 7 and the spring caps 9 and 11 are each provided with two sets of bosses for engagement with the twin springs; and, of course, two bolts 12 are used to connect each pair of spring caps 9—11.

The links 5 which, as previously noted, are pivotally connected to the ends of the primary spring 4, are pivotally connected at their upper ends to lugs 14 on the bottoms of the lower spring caps 11, and these same lugs are pivotally connected to their inner ends of short thrust links 15, the outer ends of which are pivotally connected to the respective spring brackets 7. Preferably, and as shown, the links 5 are each made up of two short laterally spaced metal straps. The tension of the secondary spring 6 should be so set that, under light loads and under ordinary running conditions, the vibrations will be taken and absorbed by the primary spring 4, but so that, under heavy loads or extreme vibrations, the coiled secondary spring 6 will yield and give increased resilience, and, also, thereby relieve the primary spring from extreme strains. The thrust links 15 permit free movements of the springs 4 and 6 but hold the body of the vehicle and the primary spring 4 against lateral movements transversely of the running gear. The recoil springs 10 prevent bounding, and the primary and secondary springs recoil after a sudden and extreme depression.

The improved spring mechanism described, while simple and of small cost, makes the vehicle easy riding and self-adjusting to varying loads and to varying shocks.

What we claim is:—

The combination with the running gear and body of a vehicle, of a primary spring secured to said body, a spring bracket on said running gear, a hanger rod working through a passageway in said spring bracket, upper and lower spring caps on said hanger rod, a secondary spring compressed between said spring bracket and said upper spring cap, a recoil spring compressed between said spring bracket and said lower spring cap, and a toggle link pivotally connected at its joint to the lower end of said hanger rod and pivotally connected at one of its ends to said primary spring and at its other end to said spring bracket, the end of said toggle link which is pivotally connected to said spring bracket holding said hanger rod against lateral swinging movement under the action of said primary spring.

In testimony whereof we affix our signatures in presence of two witnesses.

CHARLES C. GAMM.
CARL F. NELSON.

Witnesses:
EMILY M. KING,
HARRY D. KILGORE.